(12) United States Patent
Haserodt (10) Patent No.: US 8,831,002 B2
(45) Date of Patent: Sep. 9, 2014

(54) SYSTEM AND METHOD FOR REDUCING HEADERS

(75) Inventor: Kurt Haserodt, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 125 days.

(21) Appl. No.: 13/538,064

(22) Filed: Jun. 29, 2012

(65) Prior Publication Data

US 2014/0003432 A1    Jan. 2, 2014

(51) Int. Cl.
*H04L 12/56* (2006.01)

(52) U.S. Cl.
USPC ......................................................... 370/392

(58) Field of Classification Search
CPC ...... H04L 45/00; H04L 47/10; H04L 29/0653
USPC ................................................. 370/389, 392
See application file for complete search history.

(56) References Cited

U.S. PATENT DOCUMENTS

2007/0019621 A1    1/2007  Perry et al.
2007/0109985 A1*   5/2007  Wiedeman et al. ........... 370/316

FOREIGN PATENT DOCUMENTS

EP          1599009        11/2005
WO     WO 2007/028122      3/2007

OTHER PUBLICATIONS

JSR 289, SIP Servlet Specification, 1.1.
Extended European Search Report for European Patent Application No. 12185774.2 dated May 7, 2013, 6 pages.

* cited by examiner

*Primary Examiner* — Ronald Abelson
(74) *Attorney, Agent, or Firm* — Sheridan Ross P.C.

(57) ABSTRACT

A first message associated with a first communication session is received at a container. The first message is modified by adding a new header. The first message may be processed in the container. At least a portion of the new header is removed from the modified message. The removed portion of the new header is stored. The modified message without the removed portion is sent outside the container. A second message associated with the first communication message is received at the container. The stored portion of the new header is inserted into the second message. The second message with the inserted portion of the new header is processed in the container. The portion of the new header is removed from the second message and the second message is sent outside the container.

20 Claims, 5 Drawing Sheets

SYSTEM AND METHOD FOR REDUCING HEADERS

TECHNICAL FIELD

The system and method relates to managing headers in messages and in particular reducing headers in messages.

BACKGROUND

In the world of communications, a typical message that is sent across a communications network may be formatted to accommodate a variety of protocols. Each protocol adds additional headers and information to the message that are specific to the protocol. For example, a Session Initiation Protocol (SIP) message that is sent across the Internet will add additional headers specific to SIP. In some cases, certain protocols may require the addition of headers that may not be used by other devices involved in the communication session. For instance, a single device involved in a communication session may require the use of a certain protocol and, therefore, may add a header that is only used locally.

This can lead to various problems. For instance, a header that is used locally may end up being sent to a remote communication device that does not know how to handle the local leader. If the header contains information that is unknown to the receiving device, the device may respond that the message is invalid. Another problem is that the size of the message may be too long for some of the protocols involved. For example, if the message uses the Internet Protocol (IP) as an underlying protocol, the message may be dropped if the message size exceeds the maximum size allowed by the IP. In addition, information in the header may contain security information such as an IP address of devices in an enterprise network. Exposure of this information may lead to security breaches. These types of conditions are undesirable and a solution is needed to overcome these problems.

SUMMARY

Systems and methods are provided to solve these and other problems and disadvantages of the prior art. A first message associated with a first communication session is received at a container. The first message is modified by adding a new header. The first message may be processed in the container and the new header may be used during the processing of the first message in the container. A modified message may be created by removing at least a portion of the new header. The removed portion of the new header is stored. The modified message without the removed portion is then sent outside the container. A second message associated with the first communication message by virtue of the fact that it is part of the first communication session is received at the container. The stored portion of the new header is inserted in or appended to the second message. The second message with the inserted portion of the new header is processed in the container. The portion of the new header is removed from the second message and the second message is sent outside the container.

In some embodiments, the new header is a proprietary header and the removed portion of the new header comprises proprietary information of an application or thread in the container.

In some embodiments, the removed portion of the new header is removed based on an administrative configuration.

In some embodiments, the first message, the second message, and the modified message are Session Initiation Protocol (SIP) messages and the first communication session is a first SIP communication session.

In some embodiments, the new header is at least one of: a SIP Via header, a SIP record route header, and a proprietary header.

In some embodiments, the new header comprises a SIP record route header and the removed portion of the new header comprises an Internet Protocol (IP) address.

In some embodiments, the new header comprises a plurality of headers and each of the plurality of headers are added by a plurality of individual applications or threads in the container.

In some embodiments, the removed portion of the plurality of new headers is removed based on a function of individual ones of the plurality of individual applications in the container.

In some embodiments, the new header is a SIP record route header and the processes includes: receiving a third SIP message, the third SIP message being associated with a second SIP communication session; determining that the third SIP message does not need to be modified; sending the third SIP message outside the container; receiving a fourth SIP message at the container, the fourth SIP message being associated with the second SIP communication session; and in response to receiving the fourth SIP message, not inserting the stored at least a portion of the new header in the fourth SIP message.

In some embodiments, the process determines that the third SIP message does not need to be modified based on the application in the container not registering to monitor the second SIP communication session.

In some embodiments, the new header is a SIP Via header and the process includes: receiving a third SIP message, the third SIP message being associated with the first SIP communication session; determining that stored at least a portion of the new header does not need to be inserted into the third SIP message; sending the third SIP message outside the container; receiving a fourth SIP message at the container, the fourth SIP message being associated with the first SIP communication session and is a response to the fourth SIP message; and in response to receiving the fourth SIP message, not inserting the stored at least a portion of the new header in the fourth SIP message.

In some embodiments, the process determines that the third SIP message does not need to be modified based on the application in the container not registering to monitor a portion of the first SIP communication session.

In some embodiments, the modifying step is accomplished outside the container, at a boundary of the container, or within the container.

A system is also provided. The system includes a message processor configured to receive a first message associated with a first communication session, remove at least a portion of a new header in a modified message, store the removed at least a portion of the new header, send the modified message without the removed portion of the new header outside the container, receive a second message associated with the first communication session, and insert the stored portion of the new header in the second message; and an application in the container is configured to modify the first message by adding the new header.

The system also includes an embodiment where the first message, the second message, and the modified message are SIP messages, the first communication session is a first SIP communication session, the container is a Java Specification Request (JSR) 289 container, and the new header is at least one of: a SIP Via header, a SIP record route header, and a proprietary header.

In some embodiments, the new header is a SIP record route header and the removed at least a portion of the new header comprises an IP address.

In some embodiments, the new header comprises a plurality of headers and each of the plurality of headers are added by a plurality of individual applications in the container.

In some embodiments, the removed portion of the plurality of new headers is removed based on a function of individual ones of the plurality of individual applications in the container.

A computer readable medium is also provided having stored thereon, non-transient instructions that cause a processor to execute a method. The computer readable medium comprises: instructions to receive a first message associated with a first communication session at a container; instructions to modify the first message by adding a new header; instructions to remove at least a portion of the new header in the modified message; instructions to store the removed at least a portion of the new header; instructions to send the modified message without the removed at least a portion of the new header outside the container; instructions to receive a second message associated with the first communication session at the container; and instructions to insert the stored at least a portion of the new header in the second message.

DETAILED DESCRIPTION

Figure 1:
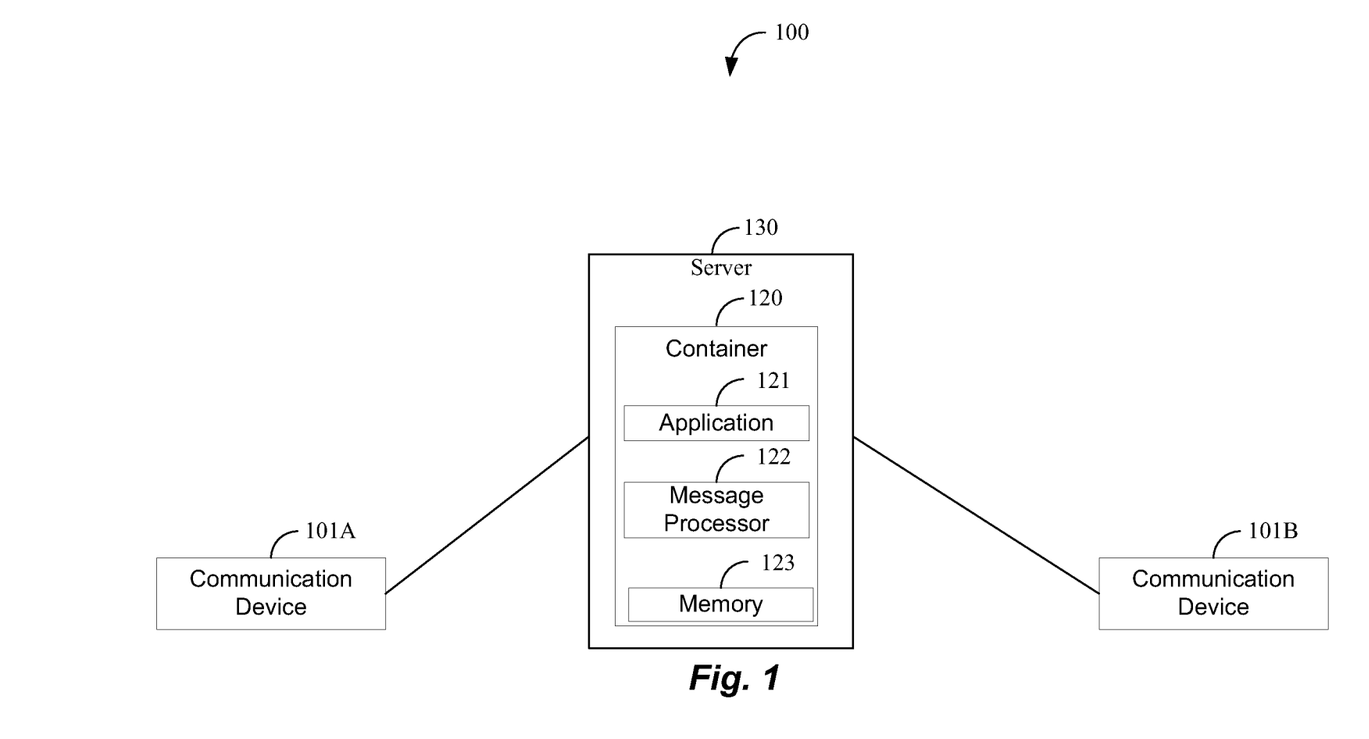
FIG. 1 is a block diagram of a first illustrative system for reducing a header in a message.

FIG. 1 is a block diagram of a first illustrative system 100 for reducing a header in a message. The first illustrative system 100 comprises communication devices 101A-101B and server 130.

Communication devices 101A-101B can be any type of communication device that can communicate with server 130. For example, communication devices 101A-101B can be a telephone, a video phone, a Personal Computer (PC), a tablet device, a cellular telephone, a Personal Digital Assistant (PDA), an H.323 device, a Session Initiation Protocol (SIP) device, an Instant Messaging (IM) device, a server, a gateway, various combinations of these, and the like. FIG. 1 shows two communication devices 101A-101B. However, FIG. 1 can comprise any number of additional communication devices 101.

Server 130 can be any device that can process messages from communication devices 101A-101B. For example, server 130 can be a communication server, a Private Branch Exchange (PBX), a router, a network node, a switch, a communications processor, any combination of these, and the like. Server 130 further comprises container 120.

Container 120 can be any hardware/software that can run a process. For example, container 120 can be a Linux container, a Windows® container, a Java Specification Request (JSR) 289 container, and/or the like. Container 120 may be a virtualized or non-virtualized container. Container 120 may be an operating system-level virtualization that provides multiple containers running on the same server. FIG. 1 shows a single container 120; however, embodiments of the present disclosure may comprise two or more containers 120. Container 120 can run on a variety of operating systems, such as Unix, Linux, Windows®, Android, a multitasking operating system, a non-multitasking operating system, an embedded operating system, and/or the like.

Container 120 further comprises application 121, message processor 122, and memory 123. Application 121 can be any application or thread that interacts with electronic communications, such as a voice recording application, a video conferencing application, a voice conferencing application, a call mixer, a call forwarding application, a call forking application, a call hold application, an Instant Message recording application, and/or the like. Message processor 122 can be any hardware/software that can process messages and/or packets. Message processor 122 may process a variety of messages, such as TCP/IP packets, UDP packets, SIP messages, H.323 messages, Real Time Protocol (RTP) messages, and/or the like. Memory 123 can be anything that can store information such as a Random Access Memory (RAM), a Flash memory, a hard disk, and/or the like.

Communication device 101A sends a first message to server 130. The first message is associated with a first communication session. A communication session may be a Session Initiation Protocol (SIP) communication session, a Real-Time Protocol (RTP) session, a File Transfer Protocol (FTP) communication session, an H.323 communication session, a video communication session, an Instant Message (IM) communication session, and/or the like. Container 120 receives the first message via Server 130.

The first message is sent to application 121. Application 121 modifies the first message by adding a new header to the first message. The new header may comprise a single header, multiple headers, a single bit in a packet, a contiguous group of headers in a packet, a non-contiguous group of headers in a packet, and/or the like. Application 121 can modify the first message for various reasons. For instance, application 121 may want to monitor communications for the first communication session, monitor communications for a portion of the first communication session, monitor for a specific message of the first communication session, monitor for a specific type of message in the first communication session, monitor for a specific group of messages in the first communication session, and/or the like. To illustrate, application 121 may be a recording application that records the RPT stream of a SIP voice call. In this example, application 121 would monitor from the initiation of a RTP stream in the communication session to the termination of the RTP stream.

How application 121 modifies the first message can be accomplished in a variety of ways. For instance, application 121 can add a Session Initiation Protocol (SIP) record route header to the first message based on application 121 wanting to record the route of a SIP communication session. Alternatively, or in addition, application 121 can modify the first message by placing a SIP Via header into the first SIP message or placing a different SIP header into the first message. In some embodiments, application 121 can add a proprietary header that contains proprietary information specific to application 121 or specific to any of the devices involved in the communication session. Moreover, modifying the first message may comprise modifying the first message using any combination of the above described processes. For example, application 121 can modify the first message by adding a SIP Via header, a SIP record route header, and a proprietary header all at the same time.

The modified message may also be processed in application 121. The modified message can be processed in various ways such as monitoring the modified message (e.g., sniffing packets), changing the modified message, deleting information from the modified message, and/or the like.

After application 121 is done processing the modified message (if necessary), processor 122 removes a portion of the new header. Message processor 122 can remove all of the new header or only specific portions of the new header. For example, if the new header is a SIP record route header, message processor 122 may remove only an IP address from the record route header or the entire record route header. If the record route header contains multiple IP addresses, message processor 122 can remove all the IP addresses. Alternatively, or in addition, if the new header comprises multiple headers such as a SIP Via header, a SIP record route header, and a proprietary header, message processor 122 may remove any combination of the three headers.

The removed portion of the new header is stored in memory 123. The modified message without removed portion of the new header is sent outside container 120. For example, the modified message without the removed portion of the new header may be sent to communication device 101B or back to communication device 101A.

A second message associated with the first communication session is received at container 120 from communication device 101A (or could be from communication device 101B). In response to determining that the second message is associated with the first communication session (or based on other reasons), message processor 122 inserts the stored portion of the new header into the second message. Application 121 processes the second message with the inserted portion of the new header. The second message with the inserted portion of the new header is sent to message processor 122. Message processor 122 removes the portion of the new header. The second message is then sent to communication device 101B or to communication device 101A.

In some embodiments, the first message, the second message, and the modified message are Session Initiation Protocol (SIP) messages. The first communication session is also a SIP communication session. Container 120 uses the JSR 289 protocol for adding new headers.

To further illustrate the above process, consider the following example using the SIP protocol. A SIP INVITE (the first message) associated with a first SIP communication session is received at container 120 from communication device 101A. The first SIP INVITE is to establish a video communication between communication devices 101A and 101B. Application 121 modifies the SIP INVITE by adding a SIP Via header to the SIP INVITE message. Application 121 processes the SIP INVITE by storing information from the SIP INVITE. Message processor 122 removes and stores the SIP Via header in memory 123. The SIP INVITE (minus the SIP Via header) is then sent to communication device 101B. Communication device 101B responds to the SIP INVITE message by sending a SIP 100 TRYING message (the second message) to container 120 via server 130. The SIP TRYING message is received by message processor 122. Message processor 122 inserts the SIP Via header into the SIP TRYING message. The SIP TRYING message with the SIP Via header is processed by application 121 by storing information about the SIP TRYING message. The SIP TRYING message with the SIP Via header is sent to message processor 122. Message processor 122 removes the SIP Via header. The SIP TRYING message (minus the SIP Via header) is then sent to communication device 101A to start the initiation of the SIP video session.

In another embodiment, instead of the first message being sent from one of the communication devices 101, the first message may originate in container 120 or application 121. For example, application 121 may initiate a SIP session.

To continue the initial embodiment described above, in a different embodiment, a third SIP message associated with the first SIP communication session is received at container 120. Message processor 122 determines that the stored portion of the new header does not need to be inserted into the third SIP message. Message processor 122 can determine that the stored portion of the new header does not need to be inserted into the third SIP message based on various reasons. For instance, because application 121 has not registered to monitor a portion of the first SIP communication session, because the third SIP message was sent from a specific communication device 101, because the third SIP message is from a specific IP address or a range of IP addresses, because of information in the third SIP message, based on the type of SIP message, and/or the like.

The third SIP message is sent outside container 120. A fourth message SIP message is received at container 120. The fourth SIP message is associated with the first SIP communication session and is a response to the third SIP message (although it does not have to be a response message). In response to receiving the fourth SIP message, message processor 122 does not insert the stored at least a portion of the new header into the fourth SIP message. The fourth SIP message is then sent outside container 120.

To further illustrate, consider the following example that builds on the previous SIP example. A SIP Provisional ACK (in response to the 100 TRYING message (the second message)) for the first SIP communication session is sent from communication device 101A. The SIP Provisional ACK (the third SIP message) is received at container 120. Application 121 determines that the stored portion of the new header does not need to be inserted into the SIP Provisional ACK. The SIP Provisional ACK is sent to communication device 101B.

A 180 SIP RINGING message (the fourth message) is received at container 120. The SIP RINGING message is associated with the first SIP communication session. In response to receiving the SIP RINGING message, message processor 122 does not insert the at least a portion of the new header into the SIP RINGING message.

In yet another embodiment, that uses SIP, and is a continuation of the initial example described above, a third SIP message associated with a second SIP communication session (a different SIP communication session) is received at container 120 from communication device 101A. Application 121 determines that the third SIP message does not need to be modified. Application 121 can determine that the third SIP message does not need to be modified based on various reasons. For instance, application 121 may not modify the third SIP message because application 121 has not registered to monitor the second SIP communication session, because the third SIP message was sent from a specific communication device, because the third SIP message is sent to a specific communication device, because the third SIP message is from a specific IP address or a range of IP addresses, because information in the third SIP message matches a specific criteria, based on a SIP message type, and/or the like.

The third SIP message is sent outside container 120. A fourth message SIP message is received at container 120. The fourth SIP message is associated with the second SIP communication session. In response to receiving the fourth SIP message, message processor does not inset the stored at least a portion of the new header into the fourth SIP message. The fourth SIP message is then sent outside of container 120.

To further illustrate, consider the following example. A second SIP INVITE (the third SIP message) for a second SIP communication session is received at container 120. The second SIP INVITE is sent from a third communication device 101 (not shown). The second SIP INVITE is to setup a voice communication from the third communication device 101 to a fourth communication device 101 (not shown). Application 121 determines that the second SIP INVITE is for a different communication session (the second SIP communication session) and does not need to be modified based on application 121 not being configured to monitor the second SIP communication session. The second SIP INVITE is sent to the fourth communication device 101. In response to receiving the second SIP INVITE, a 200 OK is sent from the fourth communication device 101. The 200 OK is received at container 120. In response to receiving the 200 OK message, message processor 122 does not insert anything into the 200 OK message. This is because nothing has been removed for the second communication session. The 200 OK is then sent to the third communication device 101.

All of the above process may work in different embodiments using different headers. For example, the new header may be a SIP record route header, a SIP Via header, and/or a proprietary header. All of the above process, although described using the SIP protocol, may also work using other protocols. For example, the above processes may be implemented using H.323 and/or video protocols.

Figure 2:
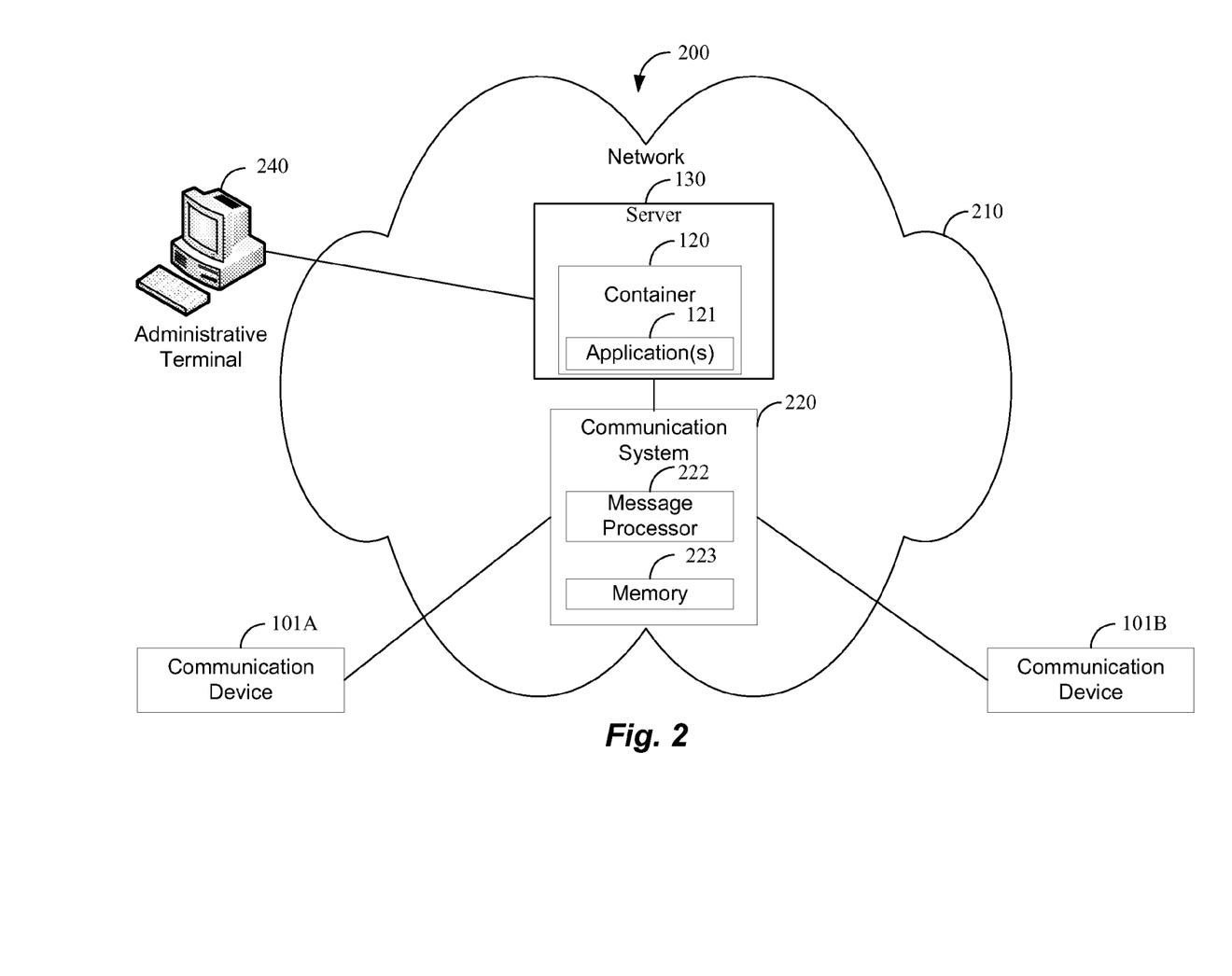
FIG. 2 is a block diagram of a second illustrative system for reducing a header in a message.

FIG. 2 is a block diagram of a second illustrative system 200 for reducing a header in a message. The second illustrative system 200 comprises communication devices 101A-101B, server 130, network 210, communication system 220, and administrative terminal 240. Server 130 comprises container 120. Container 120 comprises application(s) 121. FIG. 2 shows two communication devices 101A-101B. However, FIG. 2 can comprise any number of additional communication devices 101.

Communication system 220 can be any hardware/software that can process communications such as a server 130, a Private Branch Exchange (PBX), a switch, a router, a session manager (e.g., Avaya Aura™), and/or the like. Communication system 220 further comprises message processor 222 and memory 223.

Network 210 can be any network that can send and receive data, such as the Internet, a Wide Area Network (WAN), a Local Area Network (LAN), the Public Switched Telephone Network (PSTN), a packet switched network, a circuit switched network, a cellular network, a corporate network, a combination of these, and the like. Network 210 can use a variety of protocols, such as Ethernet, Internet Protocol (IP), Session Initiation Protocol (SIP), Integrated Services Digital Network (ISDN), H.323, and the like.

Administrative terminal 240 can be any device that can be used to administer server 130. For example, administrative terminal 240 can be a Personal Computer (PC), a tablet device, a cellular telephone, a Personal Digital Assistant (PDA), various combinations of these, and the like.

Communication device 101A sends a first message to server 130 via network 210. The first message may also be sent via communication system 220/message processor 222. The first message is associated with a first communication session. A communication session may be a Session Initiation Protocol (SIP) communication protocol session, a Real-Time Protocol (RTP) session, a File Transfer Protocol (FTP) communication session, an H.323 communication session, a video communication session, an Instant Message (IM) communication session, and/or the like. Container 120 receives the first message via Server 130.

The first message is sent to application 121. Application 121 modifies the first message by adding a new header to the first message. The modified message may also be processed in application 121. After application 121 is done processing the modified message (if necessary), the modified message is sent to communication system 220. Message processor 222 in communication system 220 removes at least a portion of the new header from the modified message. The removed portion of the new header is stored in memory 223. The modified message without the portion of the new header is sent outside network 220. For example, to communication device 101B.

A second message associated with the first communication session is received at communication system 220 from communication device 101A. In response to determining that the second message is associated with the first communication session (or for other reasons), message processor 222 inserts the stored portion of the new header into the second message. The second message with the inserted a portion of the new header is sent to application 121 via server 130/container 120. Application 121 then processes the received second message with the inserted portion of the new header. The second message with the inserted portion of the new header is sent to message processor 222. Message processor 222 removes the portion of the new header. The second message is then sent to communication device 101B.

In one embodiment, the first message, the second message, and the modified message are Session Initiation Protocol (SIP) messages. The first communication session is also SIP communication session.

In a different alternative, container 120 contains multiple (a plurality) applications 121. The multiple applications 121 can modify the first message by each adding a new header(s). For example, if application 121 were to comprise two applications, one application 121 can add a SIP Via header and the other application 121 can add a SIP record route header and a proprietary header. The three added headers (or selected ones of the three headers) can then be removed (or portions of the three headers can be removed), stored, and then inserted in the second message in a manner described above.

The new header(s) can be removed based on functionality of an individual application 121. For instance, the new header(s) may be removed based on application 121 being a security application that is recording the route of specific devices. The new header(s) may be removed based on the functionality of application 121, such as, based on application 121 encrypting of a call or conference, based on an electronic transaction application, based on a specific user of application 121, and/or the like. The new header(s) can be added and/or removed based on an administrative configuration. An administrator at administrative terminal 240 can administer specific headers or portions of headers to be added, stored, and/or inserted.

Figure 3:
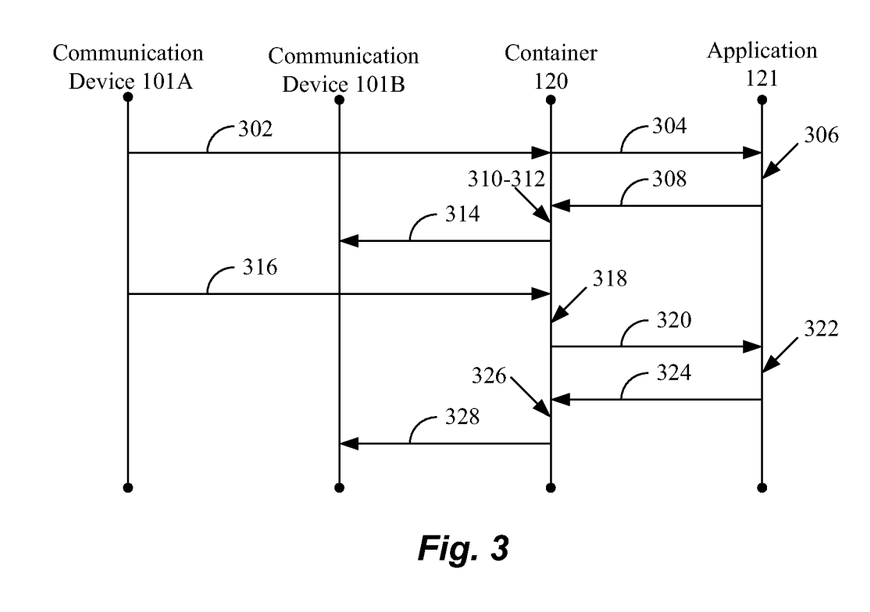
FIG. 3 is a flow diagram of a method for reducing a header in a message.
Figure 4:
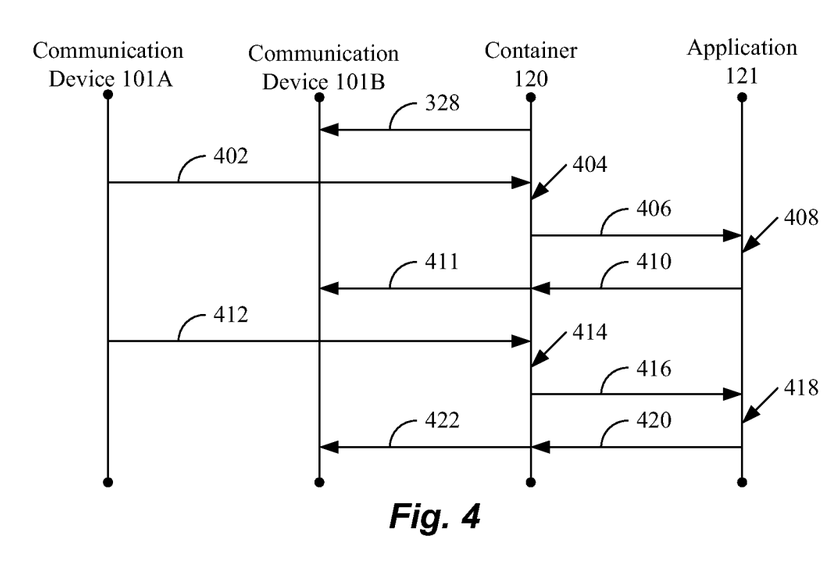
FIG. 4 is a flow diagram of a method of determining if a SIP message needs to be modified.
Figure 5:
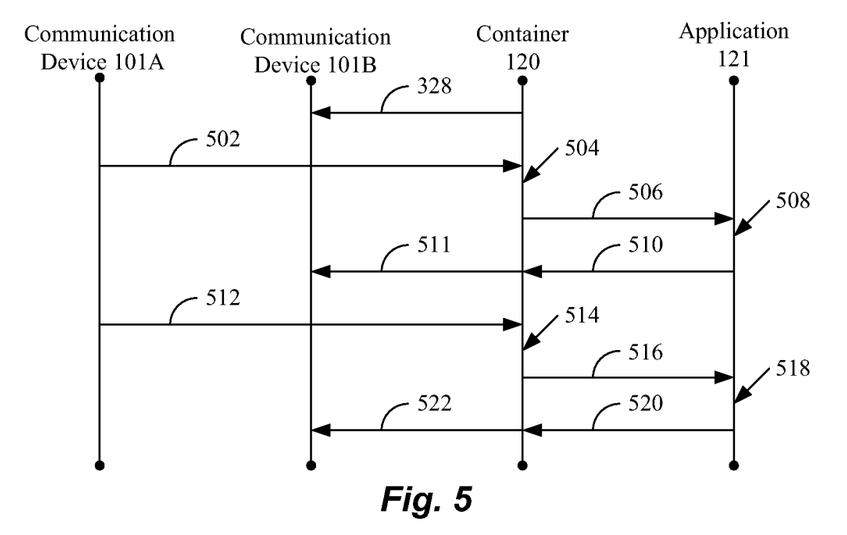
FIG. 5 is a flow diagram of a method of determining if a header needs to be inserted into a SIP message.

FIG. 3 is a flow diagram of a method for reducing a header in a message. Illustratively, communication device 101, server 130, container 120, application 121, message processors (122 and 222), communication system 220, and administrative terminal 240 are stored-program-controlled entities, such as a computer or processor, which performs the method of FIGS. 3-5 and the processes described herein by executing program instructions stored in a non-transient computer readable storage medium, such as a memory or disk. Although the methods described in FIGS. 3-5 are shown in a specific order, one of skill in the art would recognize that the steps in FIGS. 3-5 may be implemented in different orders and/or be implemented in a multi-threaded environment. Moreover, various steps may be omitted or added based on implementation.

A first message from communication device 101A is received 302 at container 120. The first message is associated with a first communication session. The first message is sent 304 to application 121. Application 121 modifies 306 the first message by adding a new header to the first message. The modified message is sent 308 to container 120. Container 120 removes 310 at least a portion of the new header. The removed portion of the new header is stored 312. The modified message without the portion of the new header is sent 314 outside container 120 to communication device 101B.

A second message associated with the first communication session is received 316 at container 120 from communication device 101A. In response to determining that the second message is associated with the first communication session, container 120 inserts 318 the stored portion of the new header into the second message. The second message with the inserted portion of the new header is sent 320 to application 121 for processing. Application 121 processes 322 the second message with the inserted portion of the new header. The second message with the inserted portion of the new header is sent 324 to container 120. Container 120 removes 326 the portion of the new header. The second message with the removed portion of the new header is sent 328 to communication device 101B.

FIG. 4 is a flow diagram of a method of determining if a SIP message needs to be modified. The process of FIG. 4 is a continuation of the process of FIG. 3 (after step 328). This exemplary embodiment assumes that the process of FIG. 3 was implemented using SIP and that the first the first message, the second message, and the modified message are Session Initiation Protocol (SIP) messages. In addition, the first communication session is a first SIP communication session.

A third SIP message associated with a second SIP communication session is received 402 at container 120 from communication device 101A. Container 121 determines 404 that the third SIP message does not need to be modified. The third SIP message may be sent 406 to application 121 (although it does not have to be). The third SIP message may be processed 408 in application 121. The third SIP message may then be sent 410 to container 120, which intern sends 411 the third SIP message to communication device 101B.

In an alternative embodiment, steps 406, 408, and 410 are optional. In the alternative embodiment, after step 404, the third SIP message is sent 411 to communication device 101B.

A fourth message SIP message is received 412 at container 120 from communication device 101A. The fourth SIP message is associated with the second SIP communication session. In response to receiving the fourth SIP message, container 120 does not insert 414 the stored at least a portion of the new header into the fourth SIP message.

The fourth SIP message may be sent 416 to application 121 (although it does not have to be). The fourth message may be processed 418 in application 121. The fourth SIP message may then be sent 420 to container 120, which intern sends 422 the fourth SIP message to communication device 101B.

In an alternative embodiment, steps 416, 418, and 420 are optional. In the alternative embodiment, after step 414, the fourth SIP message is sent 422 to communication device 101B.

FIG. 5 is a flow diagram of a method of determining if a header needs to be inserted into a SIP message. The process of FIG. 5 is a continuation of the process of FIG. 3 (after step 328). This exemplary embodiment assumes that the process of FIG. 3 was implemented using SIP and that the first the first message, the second message, and the modified message are Session Initiation Protocol (SIP) messages. In addition, the first communication session is a first SIP communication session.

A third SIP message associated with the first SIP communication session is received 502 at container 120 from communication device 101A. Container 120 determines 504 that the stored portion of the new header does not need to be inserted into the third SIP message.

The third SIP message may be sent 506 to application 121 (although it does not have to be). The third message may be processed 508 in application 121. The third SIP message may then be sent 510 to container 120, which intern sends 511 the third SIP message to communication device 101B.

In an alternative embodiment, steps 506, 508, and 510 are optional. In the alternative embodiment, after step 504, the third SIP message is sent 511 to communication device 101B.

A fourth message SIP message is received 512 at container 120 from communication device 101A. The fourth SIP message is associated with the first SIP communication session and is a response to the third SIP message (although it does not have to be a response message). In response to receiving the fourth SIP message, container 120 does not insert 514 the stored at least a portion of the new header into the fourth SIP message.

The fourth SIP message may be sent 516 to application 121 (although it does not have to be). The fourth message may be processed 518 in application 121. The fourth SIP message may then be sent 520 to container 120, which intern sends 522 the fourth SIP message to communication device 101B.

In an alternative embodiment, steps 516, 518, and 520 are optional. In the alternative embodiment, after step 514, the fourth SIP message is sent 522 to communication device 101B.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   receiving a first message associated with a first communication session at a container;
   modifying the first message associated with the first communication session by adding a new header;
   removing at least a portion of the new header in the modified first message;
   storing the removed at least a portion of the new header;
   sending the modified first message without the removed at least a portion of the new header outside the container;
   receiving a second message associated with the first communication session at the container;
   inserting the stored at least a portion of the new header in the second message;
   processing the second message with the inserted at least a portion of the new header; and
   removing the inserted at least a portion of the new header in the second message.

2. The method of claim 1, wherein the new header is a proprietary header and the removed at least a portion of the new header comprises proprietary information of an application in the container.

3. The method of claim 1, wherein the removed at least a portion of the new header is removed based on an administrative configuration.

4. The method of claim 1, wherein the first message, the second message, and the modified message are Session Initiation Protocol (SIP) messages and the first communication session is a first SIP communication session.

5. The method of claim 4, wherein new header is at least one of: a SIP Via header, a SIP record route header, and a proprietary header.

6. The method of claim 5, wherein the new header comprises a SIP record route header and the removed at least a portion of the new header comprises an Internet Protocol (IP) address.

7. The method of claim 4, wherein the new header comprises a plurality of headers and wherein each of the plurality of headers are added by a plurality of individual applications in the container.

8. The method of claim 7, wherein the removed at least a portion of the plurality of new headers is removed based on a function of individual ones of the plurality of individual applications in the container.

9. The method of claim 4 wherein the new header is a SIP record route header and further comprising the steps of:
receiving a third SIP message, wherein the third SIP message is associated with a second SIP communication session;
determining that the third SIP message does not need to be modified;
sending the third SIP message outside the container;
receiving a fourth SIP message at the container, wherein the fourth SIP message is associated with the second SIP communication session; and
in response to receiving the fourth SIP message, not inserting the stored at least a portion of the new header in the fourth SIP message.

10. The method of claim 9, wherein determining that the third SIP message does not need to be modified is based on an application in the container not registering to monitor the second SIP communication session.

11. The method of claim 4, wherein the new header is a SIP Via header and further comprising the steps of:
receiving a third SIP message, wherein the third SIP message is associated with the first SIP communication session;
determining that stored at least a portion of the new header does not need to be inserted into the third SIP message;
sending the third SIP message outside the container;
receiving a fourth SIP message at the container, wherein the fourth SIP message is associated with the first SIP communication session and is a response to the fourth SIP message; and
in response to receiving the fourth SIP message, not inserting the stored at least a portion of the new header in the fourth SIP message.

12. The method of claim 11, wherein determining that the third SIP message does not need to be modified is based on an application in the container not registering to monitor a portion of the first SIP communication session.

13. The method of claim 1, wherein at least the modifying step is accomplished outside the container.

14. A system comprising:
a message processor configured to remove at least a portion of a new header in a modified message, store the removed at least a portion of the new header, send the modified message without the removed at least a portion of the new header outside a container, receive a second message associated with a first communication session, and insert the stored at least a portion of the new header in the second message; and
an application in the container configured to modify a first message associated with the first communication session by adding the new header, wherein the first message, the second message, and the modified message are Session Initiation Protocol (SIP) messages, the first communication session is a first SIP communication session, the container is a Java Specification Request (JSR) 289 container, and the new header is at least one of: a SIP Via header, a SIP record route header, and a proprietary header.

15. The system of claim 14, wherein the new header is a SIP record route header and the removed at least a portion of the new header comprises an Internet Protocol (IP) address.

16. The system of claim 14, wherein the new header comprises a plurality of headers and wherein each of the plurality of headers are added by a plurality of individual applications in the container.

17. The system of claim 16, wherein the removed at least a portion of the plurality of new headers is removed based on a function of individual ones of the plurality of individual applications in the container.

18. A computer readable medium having stored thereon, non-transient instructions that cause a processor to execute a method, the method comprising:
instructions to receive a first message associated with a first communication session at a container;
instructions to modify the first message associated with the first communication session by adding a new header;
instructions to remove at least a portion of the new header in the modified first message;
instructions to store the removed at least a portion of the new header;
instructions to send the modified first message without the removed at least a portion of the new header outside the container;
instructions to receive a second message associated with the first communication session at the container;
instructions to insert the stored at least a portion of the new header in the second message;
instructions to process the second message with the inserted at least a portion of the new header; and
instructions to remove the inserted at least a portion of the new header in the second message.

19. The computer readable medium of claim 18, wherein the first message, the second message, and the modified message are Session Initiation Protocol (SIP) messages and the first communication session is a first SIP communication session.

20. The computer readable medium of claim 19, wherein new header is at least one of:
a SIP Via header, a SIP record route header, and a proprietary header.

* * * * *